United States Patent [19]
Dix

[11] Patent Number: 5,885,333
[45] Date of Patent: Mar. 23, 1999

[54] LOW PRESSURE DROP STEAM SEPARATORS

[75] Inventor: Gary E. Dix, Saratoga, Calif.

[73] Assignee: General Electric Company, Schenectady, N.Y.

[21] Appl. No.: 587,978

[22] Filed: Jan. 17, 1996

[51] Int. Cl.⁶ .......................... B01D 45/12; G21C 15/16
[52] U.S. Cl. .......................... 096/190; 055/308; 055/396; 055/399; 055/456; 096/207; 096/208; 376/371; 976/DIG. 195
[58] Field of Search ............................. 55/307, 308, 325, 55/396, 399, 456, 457, DIG. 17; 95/269; 96/190, 207, 215, 208, 216; 376/371; 976/DIG. 195

[56] References Cited

U.S. PATENT DOCUMENTS

| | | | |
|---|---|---|---|
| 486,144 | 11/1892 | Webber | 55/457 |
| 1,917,643 | 7/1933 | Goldkamp | 55/399 |
| 2,489,618 | 11/1949 | Cantin | 55/456 |
| 3,710,556 | 1/1973 | Barratt et al. | 55/456 |
| 3,778,980 | 12/1973 | Vancini | 55/456 |
| 3,902,876 | 9/1975 | Moen et al. | |
| 4,268,277 | 5/1981 | Rooker | 55/457 |
| 5,085,826 | 2/1992 | Oosterkamp | 55/399 |
| 5,130,082 | 7/1992 | Oosterkamp | |

FOREIGN PATENT DOCUMENTS

| | | | |
|---|---|---|---|
| 1084084 | 4/1984 | U.S.S.R. | 55/456 |
| 1344385 A1 | 10/1987 | U.S.S.R. | 96/216 |

Primary Examiner—C. Scott Bushey
Attorney, Agent, or Firm—Nixon & Vanderhye

[57] ABSTRACT

The steam/water separator includes a lower standpipe for receiving a two-phase mixture of water and steam at its lower end. Internal threads or elements spaced about the interior wall of the standpipe impart a swirl to the incoming mixture, producing a thin film along the walls. Standard pick-off rings or a porous wall may be employed to separate the liquid from the vapor. A central swirl is imparted to the flow in the region dominated by vapor. This combination of peripheral swirl followed by a central swirl for steam/water separation affords minimum pressure losses along the separator with reduced sensitivity to inlet and submergence conditions.

3 Claims, 3 Drawing Sheets

LOW PRESSURE DROP STEAM SEPARATORS

TECHNICAL FIELD

The present invention relates to separators for separating a two-phase mixture of gas and liquid and particularly relates to steam/water separators for use in a nuclear boiling water reactor (BWR).

BACKGROUND

In boiling water nuclear reactors, reactor coolant flows through a series of plenums starting with a lower core plenum, the nuclear core itself and an upper core plenum, each lying in communication with one another. The upper core plenum lies below a shroud head which has a series of standpipes that lead steam/water to a series of separators where the two-phase mixture of steam and water is separated. The separated water flows downwardly in an annulus about the core shroud for recirculation. The separated steam flows upwardly of the reactor through a steam dryer for flow outside of the reactor vessel to drive a turbine, typically for generating power.

In BWR's, this flowing mixture of vapor and liquid must be separated efficiently to provide the dry steam required for steam turbine generators. Typical reactor designs employ primary separators, each of which includes a standpipe connected to the upper core shroud and which standpipe is topped with a helical flow diverter to create a swirl flow into an enlarged separation barrel section. The resultant radial acceleration field causes the higher density liquid to move outward and flow as a film on the separation barrel. Radial pick-off rings are provided at one or more axial positions along the barrel to intercept the liquid film flow and separate it from the interior vapor flow. Discharge passages direct the separated water to a water pool which partially submerges the primary separators.

An example of the foregoing typical primary separator is described and illustrated in U.S. Pat. No. 3,902,876, of common assignee herewith. In that patent, there is illustrated a helical flow diverter in the standpipe and which diverter has a relatively large hub blocking flow in the central region. The diverter also includes diverter vanes which intersect the entire flow field to cause swirl flow over the length of the separation barrel downstream of the hub. Pick-off rings are used to intercept liquid films about the periphery of the separation barrel and to divert the separated liquid to discharge passages. Typically, two, three or more pick-off rings are axially spaced along the length of the separation barrel.

Another separator for this purpose is described and illustrated in U.S. Pat. No. 5,130,082, of common assignee herewith. In that patent, a plurality of axially spaced pick-off rings having curved inlet sections are used in conjunction with a centrally located helical swirler in the separation barrel to afford the separation.

Separation performance criteria have been established to limit the carry-over of liquid in the outlet steam flow (typically to less than 10%) and limit the carry-under of steam in the outlet liquid flow (typically to less than 0.25%) over the range of conditions encountered in normal reactor operation and transients. Separation performance is sensitive to total flow rate, the weight fraction of steam in the inlet flow, and depth of submergence into the surrounding pool of water. Acceptable separation performance has been achieved for a limited range of conditions through careful tuning of the length and angle of the helical device, the sizes, locations and configurations of the pick-off rings and the flow restriction in the first discharge passage.

There are advantages to reducing pressure losses caused by BWR primary separators. This is particularly true for BWR's which utilize natural circulation of the coolant where separator pressure losses limit coolant flows. The primary pressure losses of current separator designs are caused by the inlet flow diverter. See U.S. Pat. No. 3,902,876. That diverter includes significant flow area blockage because of its large central hub. It forces all of the two-phase flow to be mixed and diverted into a steep helical pattern as the flow passes through the swirl inducing vanes. These effects combine to create large pressure losses. Consequently, replacement of the inlet flow diverter with improved swirl devices provides significant reductions in separator pressure losses, Additionally, reducing the sensitivity of separation performance to variations of inlet parameters and submergence has additional advantages. In current designs, that sensitivity is caused by characteristics of the radial pick-off rings which are adverse to effecting efficient separation. The fixed dimension pick-off openings are difficult to match to wide ranges of liquid film flow rates and thicknesses on the separation barrel wall. Due to the axial momentum of both vapor and liquid phases, either phase is driven into the discharge passage when intercepted by a pick-off ring. Thus, when the liquid film is too thin, vapor flow is intercepted and extracted with the liquid discharge flow, resulting in high carry-under. Conversely, when the liquid film is too thick, excess liquid spills past the outer edge of the pick-off ring and is entrained into the central vapor stream. This leads to high carry-over. This sensitivity to liquid film thickness has been mitigated somewhat by incorporating a local restriction into the primary discharge passage. That restriction tends to cause back-up of liquid, filling the pick-off ring opening even when the nominal film thickness is less than the opening. An additional separation sensitivity results from the variation in submergence depth caused by variations in the surrounding pool over during BWR transients. Submergence variation changes the driving pressure differential and therefore the discharge flow. Thus, the ability to just fill the pick-off ring opening with liquid, to minimize carry-over and carry-under, is adversely impacted by variations in submergence depth. The overall separator performance is further complicated by interactions of these pick-off ring effects among the axial stages. Excess carry-over from the pick-off ring of one stage can cause larger liquid pick-off and discharge at a downstream stage, with resultant larger entrained carry-under outside of the separator.

DISCLOSURE OF THE INVENTION

According to the present invention, there is provided a gas/liquid separator which reduces separator pressure losses and also reduces sensitivity of separation performance to variations in inlet conditions and submergence by employing combinations of peripheral and central swirl devices with either standard pick-off rings or a centrifugal force separator to achieve improved separation performance and lower pressure losses. Particularly, the present design employs different types of swirl inducers in combination to match the varying steam/water conditions along the length of the separator to afford improved swirl flows at lower pressure losses. To accomplish this, swirl inducing elements are provided along the interior walls of the standpipe to impart an initial swirl to the two-phase mixture flowing through the standpipe. These peripheral elements may include helical fins, water wraps or threads, all of which create tangential velocity components in the liquid flowing near the interior walls. Thus, these interior wall or peripheral swirl inducing elements may be referred to as internal threads. Internal threads have previously been used to enhance heat transfer in steam boiler tubes and research has demonstrated their low pressure drop swirl flow capabilities. The circumferential shear forces of these internal threads transfer the tangential velocity outward from the wall region to establish the swirl flow field necessary for phase separation. Preferably, the internal threads are employed only in the standpipe to establish the initial liquid film before flow enters the separation barrel. However, such internal threads could be utilized in both the standpipe and the separation barrel. Because these internal threads project only minimally into the flow area, the necessary swirl is imparted directly to the liquid phase with relatively small pressure losses.

Once the initial liquid film is discharged from the separation barrel, for example, by a pick-off ring or by a porous membrane, as discussed below, the flow field is primarily vapor with entrained droplets and a thin wall film. At that axial location of the flow, further separation can best be achieved with a swirl inducing element acting directly on the central vapor flow to remove the residual droplets. This central swirl element may include diverter vanes, aerodynamic blades, or other helical devices to impart tangential velocity components to the vapor-droplet mixture. This may be collectively referred to as central swirl. Again, to limit pressure losses and adverse interactions with the liquid films, the central swirl elements intersect only a small fraction of the flow area to minimize the pressure losses. Also, these central swirl elements may be spaced axially along the separation barrel to likewise achieve minimum pressure loss. It will be appreciated from this description that the compound swirl caused by the initial peripheral swirl and the central swirl can be used in combination with pick-off rings or a porous wall separator, which will now be described in general.

By providing a porous separation barrel wall above the standpipe or as a continuation thereof, the radial pressure differential caused by the swirling flow centrifugal force causes extraction of the discharge liquid radially through the porous wall, i.e., a centrifugal-extraction. This type of extraction has advantageous characteristics for separation performance. Because centrifugal force pressure differential is proportional to the density of the swirling flow, the low density vapor contributes very little to the pressure differential. The centrifugal force is approximately proportional to the liquid film thickness. When a thick liquid film flows on the separation barrel wall, the driving pressure differential to extract flow is high, causing a large discharge flow. As the liquid film thins, the pressure differential and associated discharge flow automatically reduce and approach zero when only the low density vapor phase remains. Thus, with centrifugal-extraction, the liquid film is extant over some length until it is completely discharged through the porous wall. In the vapor region beyond the end of the film, there is negligible pressure differential to drive the flow through the wall. Therefore, the separation barrel wall can be porous over its entire length without causing significant vapor carry-under. When inlet or submergence conditions change, both local discharge rates and persistence length of the liquid film adjust automatically. This results in a continuous change of the liquid extraction area as required to accommodate the changed inlet or submergence conditions. Thus, wide ranges of inlet conditions can be accommodated without the changes in separation performance experienced using pick-off rings.

Preferably, a sintered metal may be used for the porous wall. The sintered metal allows for liquid extraction over the entire wall surface, while providing sufficient flow resistance to minimize any vapor flow into the discharge passage. Because centrifugal force produces less pressure differential than the axial momentum which drives flow into pick-off rings, any additional flow loss in the discharge path is eliminated with centrifugal-extraction design. This is completely acceptable since the separation performance of these designs does not require the careful flow matching necessary with pick-off rings.

To avoid entrainment effects outside of the separator, the initial liquid discharge is also submerged into the surrounding pool with centrifugal-extraction separators. This does not, however, introduce the same adverse sensitivity to submergence depth for centrifugal-extraction as long as the net pressure differential is sufficient to drive all liquid through the discharge passage. With such lower driving pressure differential using centrifugal-extraction, the porous separation barrel may necessarily be placed near or above the maximum pool level. All lower pool levels can then be accommodated with no effects on separation performance. Since separation can be achieved over shorter axial lengths, the overall vertical height of these separators can be lower than current designs.

It will be appreciated that the centrifugal-extraction design may be combined with the compound swirl described above. One or more central swirl elements may be disposed at axially spaced positions along the porous separator barrel. Using this design also eliminates the need for an upper pick-off ring because the small liquid flows through the upper portion of the porous wall do not require a surrounding barrier to avoid entrainment effects. Of course, a small pick-off ring could be used at the barrel exit to catch any residual liquid film flow.

In a preferred embodiment according to the present invention, there is provided a gas/liquid separator comprising a standpipe for receiving at a lower end thereof a two-phase gas/liquid flow, the standpipe having flow swirl inducing elements about interior wall surfaces thereof for imparting a swirl to the flow, inducing the formation of a liquid film along the interior wall surfaces and leaving a central portion of the standpipe open and a separator section including a separator barrel above the standpipe for receiving the flow and separating the liquid film and gas flows from one another and enabling flow of gas through the separator section to an outlet thereof.

In a further preferred embodiment according to the present invention, there is provided a gas/liquid separator including a second swirl inducing element in the separator barrel above the standpipe and centrally located in the barrel for imparting a swirl to the gas flow through the barrel, the second swirl inducing element being spaced from interior walls of the separator barrel.

Accordingly, it is a primary object of the present invention to provide a novel and improved gas/liquid separator, particularly for use in nuclear boiling water reactors, which minimizes separator pressure losses and reduces sensitivity of separation performance to variations in inlet conditions and submergence.

BEST MODE FOR CARRYING OUT THE INVENTION

Figure 1:
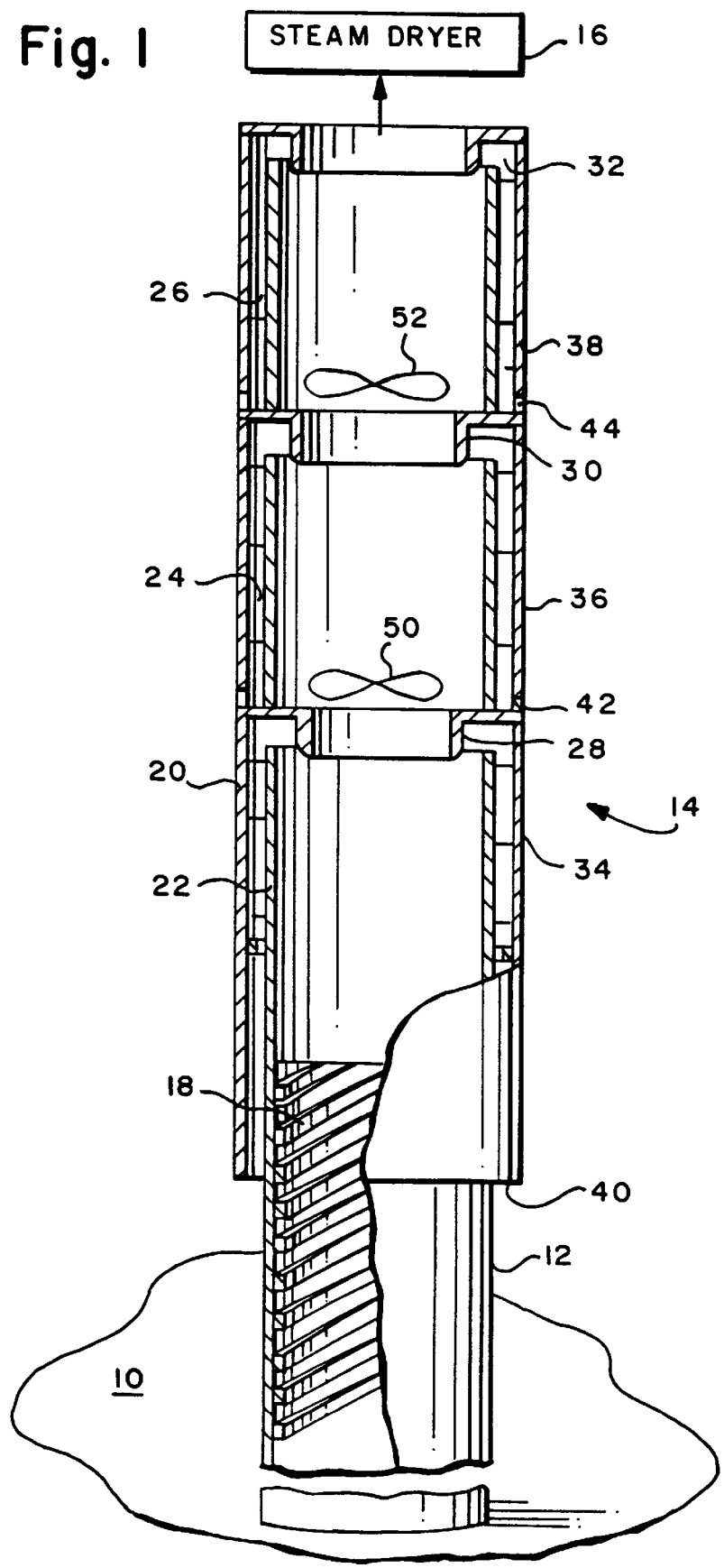
FIG. 1 is a fragmentary perspective view of an upper core shroud of a nuclear reactor having an upstanding separator with parts broken out and in cross-section for ease of illustration according to the present invention.

Referring now to FIG. 1, there is illustrated the upper shroud head 10 of a nuclear reactor, not shown, to which a plurality of standpipes are secured, one such standpipe being illustrated at 12 and forming part of a gas/liquid separator, generally designated 14, constructed in accordance with the present invention. It will be appreciated that coolant flow in a two-phase mixture of steam and water flows from the core of the reactor upwardly into a plenum below the shroud 10 for flow into the various standpipes. The flow is separated by a plurality of steam separators above the shroud, one of which is illustrated at 14. The separated steam then passes from the steam separator 14 to a steam dryer 16 and ultimately is employed to drive a steam turbine for the production of electricity. The separated liquid, i.e., water, is returned to the water coolant circulating system.

In accordance with the present invention, swirl inducing elements are provided along the interior wall surface of the standpipe 12 to provide an initial swirl to the two-phase mixture as it rises within the standpipe 12. These initial swirl inducing elements may be referred to as internal threads formed along or projecting from the interior wall of the standpipe 12. For example, recessed grooves or projecting ribs may be formed along the interior wall. Helical fins, wire wraps or threads may likewise be used to create tangential velocity components in the liquid flowing near these walls. Consequently, these internal threads provide tangential shear forces which transfers the tangential velocity outward from the wall region to establish the swirl flow field necessary for phase separation. While the internal threads 18 are illustrated in FIG. 1 as utilized only on the standpipe 12, it will be appreciated that the internal threads may be extended into the separation barrel 20 above the standpipe 12. Importantly, however, the internal threads provide a large open central region in the standpipe substantially unaffected by the swirl flow, while simultaneously the internal threads impart a swirl directly to the liquid phase adjacent the interior wall surface with relatively small pressure loss.

As illustrated in FIG. 1, the standpipe 12 has a plurality of inner tubes 22, 24 and 26 located in axial alignment one with the other above and suitably secured one to the other and to the standpipe 12. Conventional pick-off rings 28, 30 and 32 are axially spaced along the separation barrel and between the tubes 22, 24 and 26, respectively. The pick-off rings are connected to outer tubes 34, 36 and 38, respectively. It will be appreciated that the liquid separated from the gas or vapor passes into the annular chambers between the inner and outer tubes for discharge outwardly of the separator at their lower ends, for example, through openings 40, 42 and 44. It will be appreciated that the pick-off rings constitute one form of pick-off device for collecting and returning the separated liquid and that other types of pick-off devices may be utilized, for example, the porous wall described hereinafter.

It will also be appreciated that because of the initial swirl imparted to the two-phase mixture, the liquid film is primarily discharged through the first pick-off ring 28, leaving essentially a flow field consisting primarily of vapor with entrained droplets and a thin wall liquid film. Under that flow condition, further separation is best achieved by employing one or more swirl elements acting directly on the central vapor flow to remove the residual droplets.

Consequently, in FIG. 1, a central swirl element 50 is disposed axially above the pick-off ring 28. This central swirl element 50 may comprise diverter vanes, aerodynamic blades or other helical devices to impart tangential velocity components to the vapor droplet mixture. Importantly, the swirl element 50 is located centrally of the flow where it intersects only a small portion of the flow area, e.g., approximately 50% of the entire flow area. Thus, swirl element 50 imparts a further tangential velocity to the flow, causing displacement of the entrained droplets toward the inner tube walls and separation at the next pick-off location or otherwise, for example, by the porous wall described below. Additional swirl elements, for example, the central swirl element 52, can be located axially above the initial central swirl element 50 to achieve optimum separation performance with minimum pressure loss and minimum separation length.

It will be appreciated from a review of FIG. 1 that the initial swirl imparted to the two-phase flow mixture affords an initial substantial peripheral swirl with an immediately following substantial liquid phase separation, followed by a central swirl induced flow to displace liquid droplets radially outwardly to coalesce along the thin film of the separation barrel and ultimate discharge. Moreover, this compound swirl reduces separator pressure losses and sensitivity of separation performance to variations in inlet conditions and submergence. It will be appreciated that the peripheral and central swirl elements may be employed with standard pick-off rings or other pick-off devices, such as a porous wall, which will now be described.

Figure 2:
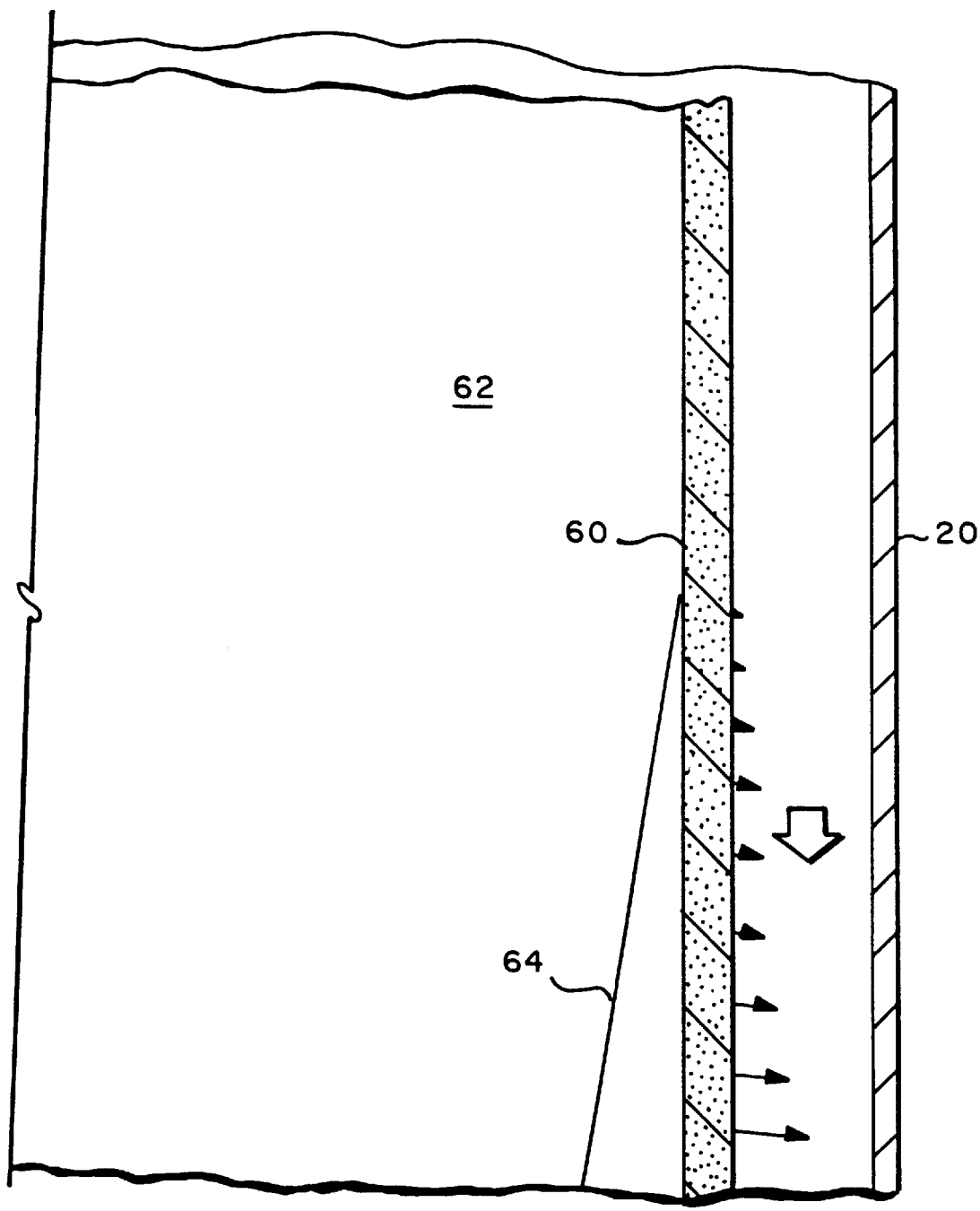
FIG. 2 is an enlarged schematic diaphragm of a porous separator wall forming part of a separator according to another form of the present invention.
Figure 3:
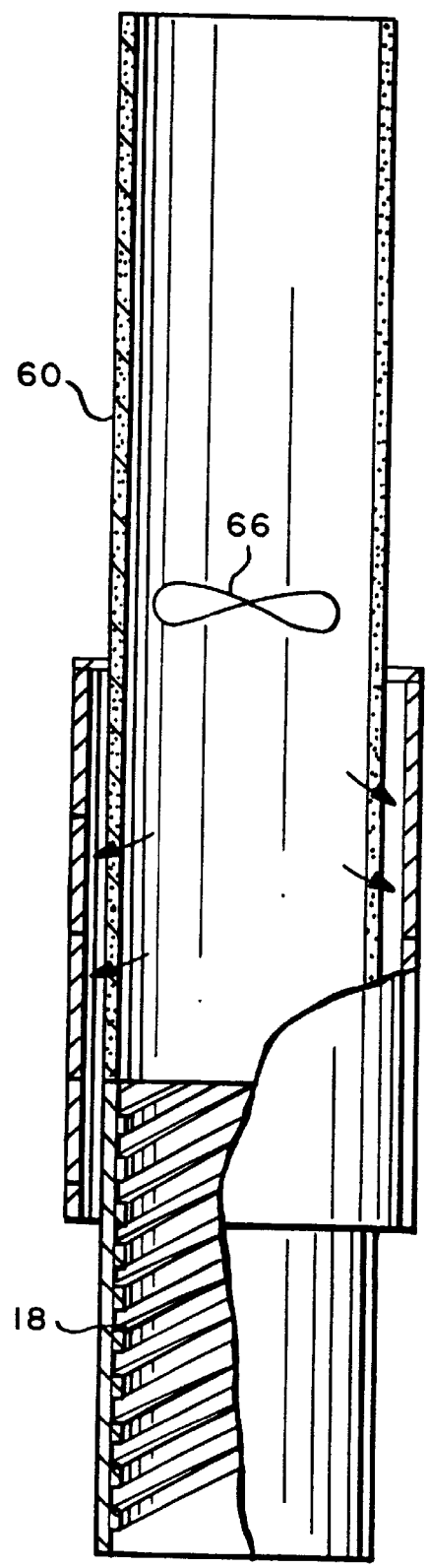
FIG. 3 is a view similar to FIG. 1 illustrating another form of the present invention.

Referring now to the embodiment hereof illustrated in FIGS. 2 and 3, the steam/water separation can be effected by using the radial pressure differential caused by the swirling flow centrifugal force to extract the discharge liquid radially through a porous separation barrel wall 60. This centrifugal-extraction through a porous wall has the advantage that the centrifugal force is approximately proportional to the density of the swirling flow. Consequently, the thicker the liquid film, the greater the driving force to discharge the liquid through the porous wall. Also, the pressure differential approaches zero as the liquid film thickness approaches zero. Thus, in the vapor region illustrated in FIG. 2 at 62, beyond the end of the liquid film 64, there will essentially be a non-flow condition through the porous wall. This is particularly advantageous because, as inlet or submergence conditions change, the length of the liquid film along the porous wall 60 likewise changes but the discharge continues and is adjusted automatically. The porous wall is preferably formed of a sintered metal because of its substantial resistance to vapor flow while affording liquid extraction.

As in the prior embodiment, one or more central swirl elements, for example, the element 66 illustrated in FIG. 3, may be employed to displace the liquid droplets toward the porous wall for discharge. Thus, the peripheral swirl and the central swirl in combination once again affords a steam/water separation with low pressure losses and reduced sensitivity to inlet and submergence conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vapor/liquid separator comprising:
   a standpipe for receiving at a lower end thereof a two-phase vapor/liquid flow;

said standpipe having flow swirl inducing elements about interior wall surfaces thereof for imparting a swirl to the flow, inducing the formation of a liquid film along said interior wall surfaces and leaving a central portion of said standpipe open;

a separator section including a separator barrel having a first pick-off member above said standpipe for receiving the flow and separating the liquid film and vapor flows from one another and enabling flow of vapor through said separator section to an outlet thereof;

a second swirl inducing element in said separator barrel above said standpipe and said first pick-off member, said second swirl inducing element being centrally located in said barrel for imparting a swirl to the vapor flow through said barrel, said second swirl inducing element being spaced from interior walls of said separator barrel, and a second pick-off member in said separator section above said second swirl inducing element for separating liquid film and vapor flows from one another and flowing the separated liquid externally of said separator barrel.

2. A vapor/liquid separator according to claim 1 wherein said elements comprise generally helically arranged fins projecting radially inwardly of said interior wall of the standpipe.

3. A vapor/liquid separator according to claim 1 wherein said elements comprise generally helically arranged threads formed along said interior wall.

\* \* \* \* \*